United States Patent [19]

Bodlaj

[11] 3,902,783

[45] Sept. 2, 1975

[54] PIEZOELECTRIC BEAM DEFLECTOR

[75] Inventor: Viktor Bodlaj, Munich, Germany

[73] Assignee: Siemens Aktiengesellschaft, Berlin & Munich, Germany

[22] Filed: Mar. 20, 1974

[21] Appl. No.: 452,813

[30] Foreign Application Priority Data

Apr. 26, 1973 Germany .......................... 2321211

[52] U.S. Cl. .................................... 350/6; 350/285
[51] Int. Cl.$^2$ .................. G02B 27/17; G05D 25/00
[58] Field of Search ............ 350/6, 7, 285; 178/7.6; 346/108; 324/97; 250/563, 235, 236

[56] References Cited

UNITED STATES PATENTS 3,758,199 9/1973 Thaxter .................................. 350/6

*Primary Examiner*—Ronald J. Stern
*Assistant Examiner*—Jon W. Henry
*Attorney, Agent, or Firm*—Hill, Gross, Simpson, Van Santen, Steadman, Chiara & Simpson

[57] ABSTRACT

A piezoelectric beam deflector for rapid periodic deflection of light beams in particular employs two adjacent columns of terminal piezoelectric discs which are attached by a rocker to two mirrors which can be rotated relative one another in such a manner that any electrically initiated extension of one column in relation to the other causes a rotation of the two mirrors in relation to each other by an increasing factor of the angular range swept by the rocker.

4 Claims, 2 Drawing Figures

PIEZOELECTRIC BEAM DEFLECTOR

BACKGROUND OF THE INVENTION

1. Field of the Invention

The present invention relates to a piezoelectric beam deflector for rapid periodic deflection, in particular rapid periodic deflection of light beams.

2. Description of the Prior Art

Piezoelectric beam deflectors heretofore known contain, for example, two super-imposed piezoelectric plates at whose ends a mirror is arranged, each being fixed at one edge only. The plates are bent as a consequence of contraction of one of the plates and simultaneous expansion of the other. It is possible to sweep an angular range and, therefore, to effect measurement of ranges and speeds of objects in relation to a reference plane when using this type of piezoelectric beam deflector.

The use of the aforementioned type of beam deflector, however, is limited by its extreme sensitivity to vibrations.

SUMMARY OF THE INVENTION

The object of the present invention is to provide a piezoelectric beam deflector by means of which substantial, precisely adjustable angular zones can be covered using low control voltages, and which is insensitive to the effects of external vibrations.

According to the invention, the aforementioned object is achieved through the utilization of two adjacent columns of terminal piezoelectric discs which are attached through a rocker to two mirrors which can be rotated relative to one another, all in such a manner that with any electrically initiated extension of one side in relation to the other, the two mirrors are rotated in relation to one another by an increasing factor of the angular range swept by the rocker.

Using this kind of beam deflector, at as little as 10% of the permissible drive voltage and with several reflections, an angular range on the part of the beams being deflected, of up to about 30° can be achieved, if a frequency of operation is employed which corresponds to the natural resonant frequencies of the deflection device. The natural resonant frequencies can be determined by the mechanical design and by the size and number of the piezoelectric discs.

Because the components which generate the vibrations are stacked one above the other to form columns, vibrational motions take place along the axes of the columns, which axes are insensitive to shocks or vibrations or external orgin. These movements are transmitted through a mechanical system to two mirrors.

Each mirror is, in particular, tilted about a pivot which is arranged in the plane of the mirror, but outside of the mirror itself, and rotatably assembled in a connecting component attached to the mirror. Each connecting component is attached, outside the mirror, in each case, to a similarly rotatably assembled rod, with a respective end of the rocker.

In order to achieve large angles of deflection of the beam being deflected, laser beams transmitted by a transmitted to the mirror system are directed onto the first mirror at such an angle that at least one reflection occurs at the first mirror and at least one reflection at the second mirror. With multiple reflection at the two mirrors, the deflection angle is increased in accordance with the number of reflections.

BRIEF DESCRIPTION OF THE DRAWING

Other objects, features and advantages of the invention, its organization, construction and operation will be best understood from the following detailed description of a preferred embodiment of the invention taken in conjunction with the accompanying drawing, on which.

DESCRIPTION OF THE PREFERRED EMBODIMENT

Figure 1:
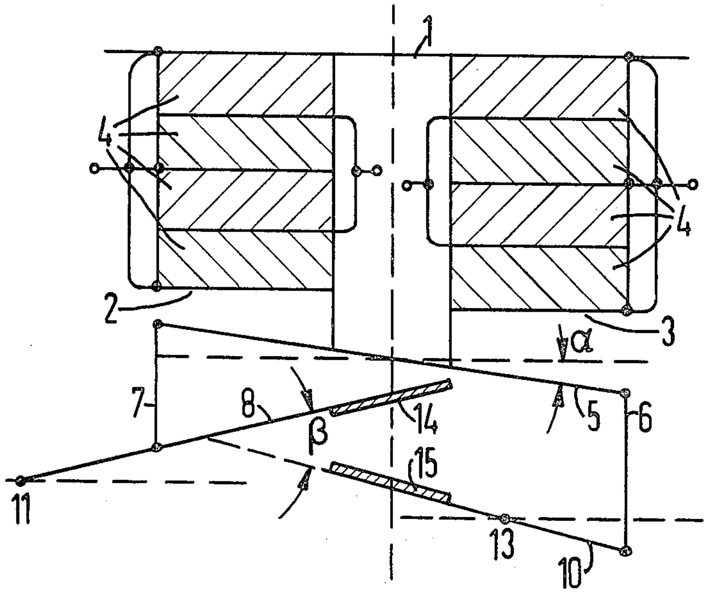
FIG. 1 is a schematic illustration of a piezoelectric beam deflector constructed in accordance with the present invention.

Referring to FIG. 1, two columns 2 and 3, each consisting of several piezoelectric discs 4, are attached to a flat surface 1. The individual discs are attached to one another through intermediate electrodes and the balancing of the discs is designed in such a fashion that with the connection of the voltage to the intermediate electrodes one column extends or expands because of the piezoelectric effect, while at the same time the other column contracts. As a consequence, a rocker 5 which is rotatably attached to the two columns 2 and 3 is displaced through an angle $\alpha$.

The rocker 5 is rotatably attached at its ends to respective rods 6 and 7 which in turn are rotatably attached to components 8 and 10 which are rotatably assembled on respective pivots 11 and 13. The connecting components 8 and 10 include respective mirrors 14 and 15 at their free ends. The mirrors 14 and 15 are therefore rotated about the pivots 11 and 13 in such a manner that they subtend an angle $\beta$ with each other. The angle $\beta$ has a function of the angle $\alpha$ and is larger than the latter.

The design of this deflector can be matched to the measuring requirements involved and can be rendered suitable to high deflection frequencies or to provide large angles of deflection.

Figure 2:
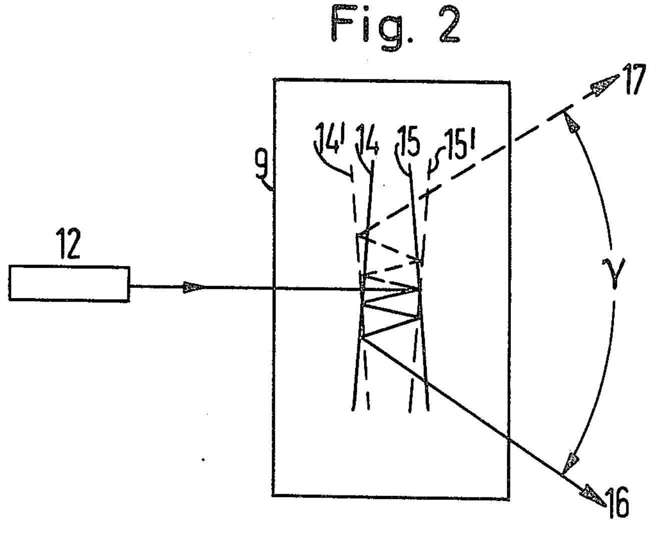
FIG. 2 is a diagrammatic illustration of the associated beam path obtained in implementing the present invention.

Referring to FIG. 2, the beam path through the beam deflector 9 has been illustrated. The beam deflector 9 comprises, among other things, the two mirrors 14 and 15, in a full line position, the references 14′ and 15′ being applied to the respective broken line positions. A beam transmitted from a transmitter 12 passes from above the plane of the paper onto the first mirror 15, is reflected back and forth several times between the mirrors 14 and 15, and ultimately, beneath the plane of the paper, exits in the direction 16 to an external target. After half a deflection period, the two mirrors have the positions 14′ and 15′ then, the beam is reflected back and forth several times at the mirrors in the positions 14′ and 15′ and exit in the direction 17.

In the indicated two positions of the mirrors, an angular range of, for example, $\gamma = 30°$ is swept. The beam deflector can be employed in many processes where this kind of angular range is to be rapidly scanned. Scanning, of course, is effected through an application of voltages, as mentioned above to the intermediate electrodes illustrated in FIG. 1.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A piezoelectric beam deflector for rapid periodic deflection of a light beam, comprising: a pair of piezoelectric columns each including stacked piezoelectric discs and electrodes on said discs, each of said columns fixed at one end and extending adjacent each other, said columns assuming opposite states of expansion and contraction in response to the application of deflection voltages to said electrodes; a rocker rotatably attached to and moved by the free other ends of said columns; a pair of mirrors mirror mounting means for mounting each mirror for rotation about a pivot point; and linking means connecting said mirror mounting means to said rocker so that said mirrors rotate in opposite directions upon movement of said rocker.

2. The beam deflector set forth in claim 1, wherein said mirrors mounting means comprises a pair of mirror mounting means each carrying a separate one of said mirrors and each including an arm rotatable about said pivot point, and said linking means comprises a pair of connecting components connecting respective ones of said arms to said rocker.

3. The beam deflector set forth in claim 1, comprising means for directing a beam for at least one reflection by a first of said mirrors and at least one reflection by the second of said mirrors.

4. The beam deflector set forth in claim 1, wherein said mirror mounting means comprises a pair of arms carrying respective ones of said mirrors at ends thereof, each of said arms having a pivot displaced from the respective mirror, and said linking means comprises a first connecting link pivotally connecting one end of said rocker to a first of said arms at a point between the respective mirror and its pivot, and a second connecting link pivotally connecting the other end of said rocker to the second of said arms at a point where the pivot of that arm is between that point and the respective mirror.

* * * * *